Nov. 12, 1935.　　　F. H. GULLIKSEN　　　2,020,942

REGULATING SYSTEM

Filed June 27, 1933　　　2 Sheets-Sheet 1

WITNESSES:

INVENTOR
Finn H. Gulliksen.
BY
Franklin E. Hardy
ATTORNEY

Nov. 12, 1935.    F. H. GULLIKSEN    2,020,942
REGULATING SYSTEM
Filed June 27, 1933    2 Sheets-Sheet 2

WITNESSES:

INVENTOR
Finn H. Gulliksen.
BY Franklin E. Hardy
ATTORNEY

Patented Nov. 12, 1935

2,020,942

UNITED STATES PATENT OFFICE 2,020,942

REGULATING SYSTEM

Finn H. Gulliksen, Wilkinsburg, Pa., assignor to Westinghouse Electric & Manufacturing Company, East Pittsburgh, Pa., a corporation of Pennsylvania Application June 27, 1933, Serial No. 677,836

14 Claims. (Cl. 172—293)

My invention relates to regulating systems and it has particular relation to systems for maintaining a predetermined speed relation among a plurality of electrical machines.

In certain applications where a plurality of separate driving motors are utilized to propel different portions of a common equipment, such for example as in the art of paper making, it is essential that the speeds of the several motors be very accurately maintained at predeterminedly related values. In the majority of applications of this kind, direct current motors are utilized because they are inherently capable of a very broad range of accurate speed control which may be effected through adjustment of the motor excitation.

In such regulating systems a satisfactory practice is to compare the speed of each of the motors to be regulated with that of a master machine which rotates at a constant or desired rate, this comparison being made in such manner that variations from the desired speed relation will act to initiate corrective adjustments of the motor excitation. In the past it has been customary to utilize for the purpose of speed comparison a mechanical differential mechanism which actuates an adjustable element in the excitation-control system of the motor. Such a mechanism, however, involves a relatively complicated assemblage, of expensive mechanical parts, requires thorough lubrication and maintenance, and is subject to other disadvantages which make its replacement by a simpler control device generally desirable.

With the adaption of electronic-tube control devices for excitation adjusting service in speed and other regulating systems, it is found that the higher sensitivity which such tubes afford accentuates the tendency of the system to hunt or overshoot in effecting corrective adjustments. Past attempts to stabilize such regulating systems have almost invariably resulted in serious loss of sensitivity, which, needless to say, is highly undesirable.

Likewise, in speed regulating systems, for electric motors no satisfactory stabilizing schemes have, in the past, been provided which are capable of properly differentiating load-change impulses from speed-change impulses in their modification of the corrective action. As will be more completely pointed out, such a differentiation is highly important if best results are to be obtained.

Electronic-tube control circuits require, for most satisfactory performance, in the majority of cases an energization from a direct current source, and therefore necessitate the use of direct current control impulses, particularly in regulating systems of the type under consideration. On the other hand, many highly satisfactory change-responsive elements are suitable for operation in alternating current circuits only, so that there exists a distinct need for a satisfactory means of converting the changes in the alternating-current quantity into approximately corresponding changes in a direct-current quantity which may be directly introduced into the grid-control circuit of the electronic tube.

My invention is directed to an improved system for effecting regulation in speed and other comparable applications which overcomes the disadvantages above pointed out and which possesses further advantages to be particularized hereinafter.

One object of my invention is to provide a regulating system for a plurality of motors that is capable of accurately maintaining the speeds of the several motors in a given predetermined relation, and which is simple in construction, reliable in operation, and relatively low in cost.

Another object of my invention is to provide a regulating system of the type described that is applicable to direct-current motors the excitation of which is controlled by means of electronic tubes.

A further object of my invention is to provide, in a speed regulating system in which the speed of each regulated machine is compared with that of a master-speed machine, an electrical control unit which replaces the mechanical differential mechanism and the adjustable element actuated thereby which have heretofore been required in such applications.

An additional object of my invention is to provide, in a regulating system, means whereby a change-responsive element suitable for operation in an alternating-current circuit may satisfactorily influence direct-current control circuits comprised by electronic-tube quantity-adjusting means.

Another object of my invention is to provide, in combination with electronic-tube quantity-adjusting means of conventional type, an auxiliary electronic tube which functions in a manner to materially quicken the response of the quantity-adjusting tube to direct-current control impulses.

A still further object of my invention is to provide, in a speed regulating system of the type described, stabilizing means which differentiate between changes in speed of the regulated motor and changes in the loading thereof.

My invention, together with additional objects and advantages, will best be understood through the following description of specific embodiments thereof when taken in conjunction with the accompanying drawings, in which.

Figure 1:
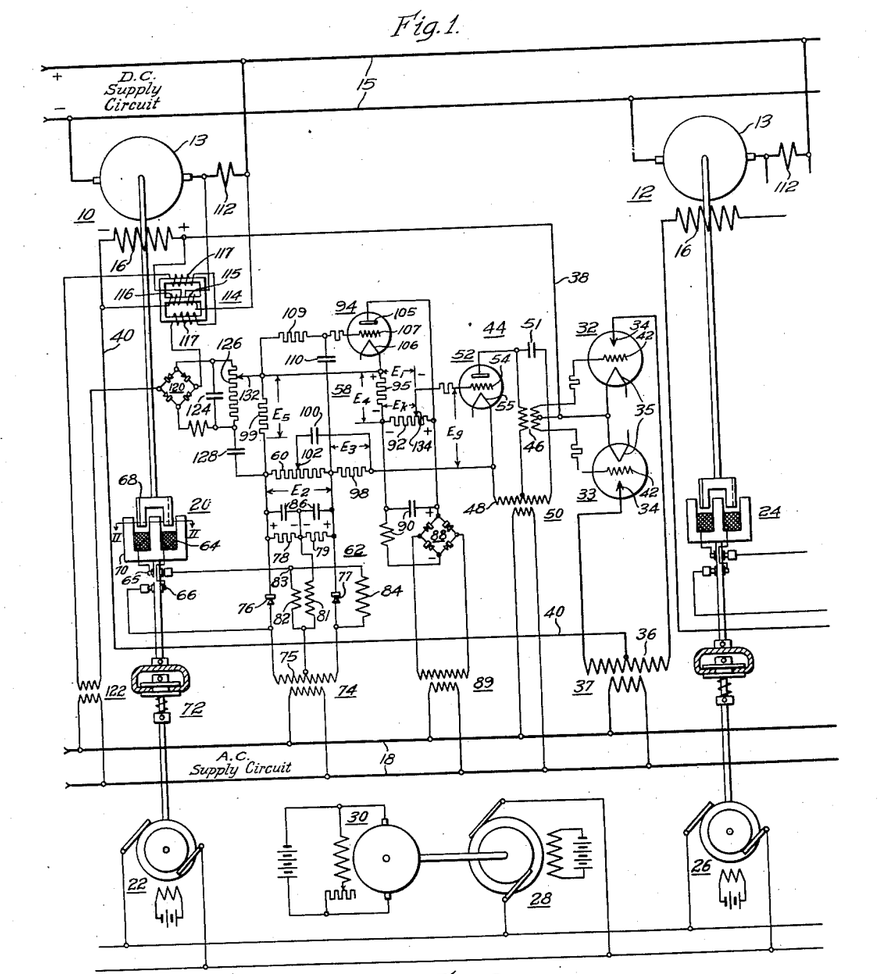
Figure 1 is a diagrammatic view illustrating apparatus and circuits comprised by a preferred form of the regulating system of my invention shown as being applied to regulate the speeds of a plurality of direct-current motors.

Referring to the drawings, and particularly to Fig. 1 thereof, two of the plurality of direct-current motors whose speeds are to be regulated are illustrated at 10 and 12. The motors comprise armature windings 13 that are connected to direct-current supply circuit conductors 15 and shunt field windings 16 that are energized by rectified current derived from alternating-current supply conductors 18. The motor 10 drives one element of an electrical differential device 20, the other cooperatively disposed element of which is connected to a pilot or speed-setting motor 22. Motor 12 is similarly associated with a control device 24 and a pilot motor 26.

The motors 22 and 26 are illustrated as of the synchronous type and are connected in parallel and supplied from a synchronous generator 28 that is driven at a constant speed of adjustable magnitude by any suitable means such as a direct current motor 30.

In the field-winding circuit of motor 10 a pair of rectifier tubes 32 and 33 are provided, which tubes have anode elements 34 connected to opposite ends of the secondary winding 36 of a transformer 37, the primary winding of which transformer is directly connected to the supply conductors 18. The cathode elements 35 of the tubes are joined together and connected by conductor 38 to one side of the motor field winding 16. The other side of this winding is connected by means of a conductor 40 to the mid-tap of the transformer winding 36.

Tubes 32 and 33 are preferably of the grid-controlled, gas-filled type, each being capable of conducting current only from the anode element to the cathode element thereof. Thus in the particular connection shown, tube 32 will pass current to the field winding 16 during alternate half-cycles of the alternating voltage wave while the tube 33 will similarly pass current during the remaining half cycles. The effective value of this current may be controlled by changing the characteristics of the potential impressed upon the tube grid elements 42.

For the purpose of supplying a grid-control potential to these elements, a phase-shifting bridge circuit 44 is provided, and comprises a grid-influencing transformer 46 connected between the mid-point of the secondary winding 48 of a transformer 50 and a conductor connecting a capacitor 51 with an adjustable resistance element which is in the form of an electronic tube element 52. This capacitor and control tube are connected in series and energized from the secondary winding 48 of the transformer 50, the primary winding of which is energized directly from the supply circuit 18.

The amount of phase shift between the voltage of the transformer 46 and the supply circuit voltage is controlled by varying the effective conductivity of tube 52, which tube is preferably of a well known vacuum type. The general form of the phase-shifting bridge circuit shown at 44 is more completely described in a copending application Serial No. 568,537 by F. H. Gulliksen, filed October 13, 1931, and assigned to the same assignee as is this invention.

The conductivity of control tube 52 is varied by changing the magnitude of the potential $E_g$ impressed between the grid and cathode elements 54 and 55, respectively, of the tube. Normally the grid element is maintained at a small negative potential with respect to the cathode or filament which potential is supplied and controlled by means of a special direct-current circuit shown generally at 58. When the negative grid bias of the tube is increased, the tube becomes less conductive and thus offers a higher resistance to the flow of current therethrough with the result that the voltage drop across it is raised and that across the capacitor 51 is lowered. This increases the displacement angle of the output voltage of the bridge circuit, which voltage is impressed upon the grid elements of tubes 32 and 33. By thus causing each of tubes 32 and 33 to become conductive at a later time during the positive half-cycle of the anode voltage the effective current supplied to the field winding of the motor 10 is reduced, and the speed of the motor is accordingly increased.

In a similar manner, a decrease in the magnitude of the negative bias applied to the grid of control tube 52 raises the tube conductivity and causes it to offer less resistance to the flow of current therethrough, with the result that the voltage drop across it is lowered and that across the capacitor 51 is raised. This decreases the displacement angle of the output voltage of the bridge 44, and causes the tubes 32 and 33 to become conductive at an earlier point in the positive half-cycles of the anode voltage, thus raising the effective current supplied to the motor field winding 16. The increased motor excitation tends to cause the motor to run at a reduced speed.

The grid potential $E_g$ impressed upon tube 52 is, as has been mentioned, supplied from a direct current circuit shown generally at 58, the major control influence for which comprises a speed-change responsive potential $E_2$ impressed upon a potentiometer resistor 60 by a rectifier bridge circuit 62 which is influenced by the reactor differential device 20, which, as has been mentioned, takes the place of the mechanical differential mechanism heretofore required in applications of the type under consideration.

As illustrated in Fig. 1, device 20 is in the form of a reactor comprising a winding 64 connected through suitable slip rings 65 and 66 with the bridge circuit 62 and a pair of cooperating core members 68 and 70 which are respectively driven in the same direction by the regulated motor 10 and by the master speed machine 22. As is more clearly illustrated in Fig. 2, the two cooperating core members 68 and 70, which are preferably of a laminated construction, may rotate relative to each other to thereby effect changes in the reluctance of the magnetic circuit with which the device winding 64 is associated.

Figure 2:
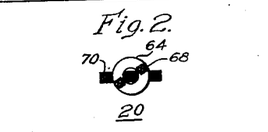
Fig. 2 is a sectional view of the reactor-differential device utilized by the system of Fig. 1 taken on line II—II of Fig. 1.

For the intermediate relative position illustrated in Fig. 2, the magnetic circuit reluctance and hence the reactance offered by winding 64 to the flow of alternating current therethrough is of an intermediate value. When member 68 is rotated clockwise (Fig. 2) to bring it into parallel alinement with member 70, the magnetic circuit reluctance is of its lowest value and the device reactance is accordingly at its upper limit. Similarly, when core member 68 (Fig. 2) is rotated counter-clockwise to a position at right angles to the cooperating member 70, the reluctance of the magnetic circuit is increased to a maximum and the reactance of device 20 is accordingly reduced to its lower limit. Intermediate positions of the two core members result, of course, in intermediate values of device reactance.

Figure 9:
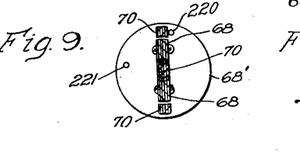
Fig. 9 is a sectional view of an electrical differential shown in Fig. 8, taken on line IX—IX thereof.

When combined in the regulating system in the manner illustrated in Fig. 1, it will be apparent that, when the speeds of the two driving machines 10 and 22, rotating in the same direction, exactly match each other, the two device core members 68 and 70 will remain in a constant relative position in their rotation and the reactance of the device will remain unchanged. However, as soon as the speed of one machine deviates from that of the other, a change in relative position of the core members immediately results, which change acts to appropriately vary the device reactance. As is shown in Fig. 9, the device 20 is provided with mechanically engageable stops 220 and 221 which limit the relative rotation of the two members to a range of slightly less than 90°.

In order to provide for the condition which obtains when the limit of relative core movement has been reached by device 20 and the speed of the regulated machine continues to deviate, a slip clutch 72 is inserted between one of the two machines and the device. This friction drive allows relative rotation when the limit of travel of the reactor cores tends to be exceeded and thus prevents damage to the device and its driving connections.

For purposes of explanation, it will be assumed that as the speed of regulated motor 10 decreases below that of standard-speed machine 22, the position of the reactor cores will be changed in the direction to lower the reactance of device 20 and that when the speed of motor 10 increases above that of machine 22 the cores will be adjusted in a direction to raise the reactance of device 20.

Considering the bridge circuit 62 with which device 20 is connected, the circuit derives its energization from the alternating current conductors 18 through a transformer 74, the two ends of the secondary winding 75 of which are connected through rectifiers 76 and 77 respectively with an impedance circuit comprising a pair of similar resistors 78 and 79 which are paralleled by capacitors 86. Between the common connection of resistors 78 and 79 and a mid-tap connection of transformer winding 75 is connected the secondary winding 81 of a transformer the primary winding 82 of which is energized through a circuit which includes the mid-tap of winding 75 and the common connection 83 between reactor differential 20 and a reactor 84 having a fixed value of reactance equal to that of device 20 when adjusted to an intermediate position in its range. Reactors 20 and 84 are respectively joined with the ends of transformer winding 75 to be energized in series by the total voltage acting therein.

In operation of the rectifier bridge circuit 62, during one-half of each cycle of the alternating current voltage supplied through transformer 74, rectifier 76 passes a current which circulates through resistor 78, and during the other half of each cycle rectifier 77 similarly passes current which circulates through resistor 79, the return circuit for these two currents being through transformer winding 81 back to the mid-tap of transformer winding 75. The voltage drop through the two resistors resulting from the pulsating currents charges the capacitors 86 to potentials determined by the relative magnitudes of the resistor currents. When the primary winding 82 of the transformer is unenergized, as is the case for the balanced condition of the two reactors 20 and 84, the magnitudes of these two potentials are equal, and being of opposite polarities they exactly cancel each other, thereby making output voltage $E_2$ of the bridge, which is impressed upon potentiometer resistor 60, zero.

However, in the event that the reactance of device 20 is adjusted to a value below that of reactor 84, a lesser portion of the total voltage produced by transformer winding 75 will appear in the form of a drop across reactor 20 than appears across reactor 84 with the result that the point of common connection 83 will be at a different voltage than is the mid-point of winding 75. As a result, the primary winding 82 of the transformer will be influenced by a potential which is in phase with that acting in the left portion of the bridge 62 and the secondary winding 81 of the transformer will have induced in it a voltage which adds to that supplied to the circuit of resistor 78 by the left half of transformer winding 75. As a result of this increase in voltage acting in the energizing circuit of resistor 78, the potential across this resistor and its associated capacitor will rise above that across resistor 79, thereby causing the bridge to supply to resistor 60 a potential $E_2$ which makes the left end of the resistor positive with respect to the right end.

It has already been assumed that a decrease in the speed of regulated motor 10 lowers the reactance of device 20, so that it may be stated, for purposes of explanation, that such a lowering in regulated motor speed results in a control potential $E_2$ of the polarity just named, the condition of zero control potential being assumed to correspond to the exactly matched condition of motor speed with respect to that of master machine 22.

In a similar manner, when the speed of regulated motor 10 rises and the reactance of device 20 is correspondingly raised above that of fixed reactor 84, transformer winding 82 will be influenced by a potential which is in phase with that acting in the right side of bridge circuit 62. This raises the voltage across the resistor 79 and its associated capacitor and thereby reverses the output voltage $E_2$ to a polarity in which the right hand end of resistor 60 is made positive with respect to the left hand end. It will, of course, be understood that the magnitude of this control potential $E_2$ depends upon the amount of displacement of the cooperating cores 68 and 70 of reactor 20 from the position corresponding to the balanced or intermediate condition.

To supply a component of unvarying energizing voltage to direct-current control circuit 58, any suitable source of uni-directional potential of substantially constant magnitude may be utilized. As illustrated in the system of Fig. 1, such a source comprises a full wave rectifier 88 energized from the alternating current circuit 18 through a transformer 89 and supplying from its output terminals, through filter elements 90, a uni-directional potential to a resistor 92 which potential is of the polarity indicated. This resistor potential is applied to the major elements of a response-quickening vacuum tube 94 in the major-element circuit of which is disposed a resistor 95 through which the tube current sets up a voltage drop $E_4$ making the upper end of the resistor positive with respect to the lower end. This potential $E_4$ is introduced into the control circuit 58 in such manner as to maintain the grid element 54 of control tube 52 at a negative potential with respect to the filament element 55. To adjust the magnitude of this potential, a tapped connection 134 is made from the tube grid element to an intermediate point on the resistor 92 so that a portion of the resistor voltage $E_k$ acts to oppose voltage $E_4$, the algebraic sum of these voltages $E_1$ being of the proper operating value for the tube 52.

In addition to the component $E_1$, the grid potential $E_g$ is made up of the major modifying component $E_2$ which is responsive to deviations in the speed of regulated machine 10, an anti-hunting component $E_3$ which is of zero magnitude except upon the occurrence of changes in the major modifying component $E_2$, and a load and excitation-change stabilizing component $E_5$ which is zero except upon the occurrence of changes in the armature or field-winding current supplied to regulated motor 10.

It has already been pointed out that an increase in the negative grid bias voltage $E_g$ supplied to control tube 52 renders the tube less conductive and, through the action of phase shifting bridge circuit 44, reduces the effective conductivity of excitation supplied tubes 32 and 33 to effect a decrease in the excitation of motor 10 and a corresponding rise in speed. Similarly, a decrease in the negative grid bias voltage $E_g$ supplied to tube 52 effects an increase in the excitation of the regulated motor and thereby causes it to run at a slower speed.

Disregarding the stabilizing voltages $E_3$ and $E_5$ introduced into the tube control circuit by means of resistors 98 and 99 respectively, it will be seen that changes in the magnitude and polarity of the major control potential $E_2$ act to correspondingly effect changes in the magnitude of grid voltage $E_g$. In operation of the regulating system, an increase in the speed of the regulated motor 10 above that of master device 22 adjusts reactor 20 in the reactance-increasing direction. This causes rectifier bridge 62 to impress upon the potentiometer resistor 60 a potential $E_2$ making the left end of the resistor positive with respect to the right end. This potential subtracts from the predominating component $E_1$ in the control grid circuit and thereby reduces the negative bias voltage $E_g$ applied to the grid 54 of tube 52. Tube 52 accordingly acts, through phase shifting bridge circiut 44, to raise the conductivity of tubes 32 and 33 and thereby effects an increase in the exciting current supplied to field winding 16 of motor 10 which tends to lower the speed of the motor.

In a similar manner, a decrease in the speed of motor 10 below that of master machine 22 adjusts device 20 in the reactance-lowering direction, thereby causing rectifier bridge 62 to impress, across resistor 60, a potential $E_2$ which makes the right end of the resistor positive with respect to the left end. This voltage adds to the predominating component $E_1$ in the grid control circuit of tube 52 and thereby increases the value of negative bias applied to the grid element of this tube. The tube acts, through bridge circuit 44, to lower the conductivity of tubes 32 and 33 to decrease the excitation of motor 10 and thereby effects an increase in the motor speed.

In the absence of means additional to those which have already been explained in detail, the regulating system would, in actual operation, have a pronounced tendency to hunt or overshoot in its corrective action because corrective changes in the excitation of the regulated motor cannot instantaneously be followed by the corresponding adjustments in motor speed. Hence, changes in the major control potential $E_2$, if allowed to instantaneously or directly appear as changes in the grid control potential $E_g$, would carry the excitation adjustment past the point necessary to finally correct the deviations in motor speed which produced them.

To counteract this tendency to hunt which is inherent in practically all regulating systems, particularly those possessing high sensitivity, as does the system of my invention, I shunt a portion of the potentiometer resistor 60 by a series connection of the resistor 98 and a capacitor 100. This allows only the unshunted or left hand portion of resistor 60 to produce variations in the control voltage $E_g$ which are exactly simultaneous with changes in the major control potential $E_2$, the voltage changes appearing across the right or shunted portion of resistor 60 being stored up in the form of a condenser charge which is gradually released, as will be explained.

Assuming that initially major-control voltage $E_2$ is of such polarity that the left end of resistor 60 is positive with respect to the right end, the capacitor 100 is charged with a potential which makes the left hand plate positive with respect to the right hand plate. As long as voltage $E_2$ remains constant, no current will be drawn through resistor 98, and the voltage drop $E_3$ through the resistor will, for such a condition, be of zero magnitude. However, upon the occasion of an increase in the magnitude of potential $E_2$, capacitor 100 draws through resistor 98 a charging current which sets up in the resistor a voltage drop making the right end of the resistor positive with respect to the left end. For this condition voltage $E_3$ thus opposes, in the grid control circuit of tube 52, the change in major control potential $E_2$ which produced the resistor drop $E_3$.

In a similar manner, upon the occurrence of a decrease in the magnitude of major potential $E_2$, the capacitor 100 forces through resistor 98 a discharge current which reverses the polarity of voltage $E_3$ thereby also causing it to oppose, in the grid control circuit 58, the change in $E_2$ which produced it.

In the event that the major control potential $E_2$ is initially of a polarity which makes the right end of resistor 60 positive with respect to the left end, the capacitor 100 will have been charged in such manner that the right hand plate is positive with respect to the left hand plate. An increase in the magnitude of $E_2$ thus causes the capacitor to draw through resistor 98 a charging current which makes the left end of the resistor positive with respect to the right end, a polarity which opposes, in the grid circuit 58, the increase in the magnitude of $E_2$. In a similar manner, a decrease in $E_2$ allows the capacitor 100 to force through resistor 98 a discharge current making the right end of the resistor positive with respect to the left end, which again causes potential $E_3$ to oppose the change in major control potential $E_2$.

The magnitude of capacitor current which produces the opposing voltage $E_3$ is, of course, greatest immediately after the change in major potential $E_2$ has been effected and gradually reduces as the capacitor charge approaches the new value required by the changed magnitude of $E_2$. This, in effect, causes the shunted portion of resistor 60 to have its voltage change cancelled or stored up at the start and gradually released following the change in potential $E_2$ and in this manner over-shooting of the corrective action which results from the changes in $E_2$ is effectively prevented. The amount of this delay, and relative effectiveness thereof, in the changes in the voltage of the shunted portion of resistor 60 may, of course, be adjusted through a wide range by changing the proportions of capacitor 100 and resistor 98. Furthermore, by changing the position of the tap connection 102 along the length of resistor 60, the relative magnitude of this antihunting influence may be modified to suit operating conditions of the regulating system, the arresting influence, of course, being greatest when the tap is at the left end of resistor 60 and minimum when the tap approaches the right end of the resistor.

The function of auxiliary tube 94 as a response-quickening means, has already been mentioned. The purpose of this tube is to act as a special amplifier to increase the sensitivity of the regulating system by causing changes in major control potential $E_2$ to effect simultaneously with or immediately after their occurrence, more than proportional changes in the magnitude of grid control potential $E_g$. In the system illustrated in Fig. 1, this result is accomplished by causing tube 94 to, simultaneous with the changes in potential $E_2$, vary its conductivity and thereby change the magnitude of voltage $E_4$, which is one of the two components making up predominating potential $E_1$ in the grid control circuit 58.

For settled or balanced conditions of the regulating system, the voltage $E_4$ appearing across resistor 95, as a result of the current conducted from anode 105 to the cathode 106 of tube 94, which current results from the potential appearing across resistor 92 supplied from transformer 89 through rectifier 88, is constant and of the indicated polarity which maintains the grid bias $E_g$ of control tube 52 of a negative value. The grid element 107 of tube 94 is for such a balanced condition maintained, in the particular connection shown in the diagram, at zero potential. Between the grid and filament elements of the tube 94 is connected a resistor 109 which is influenced, through a series-connected capacitor 110, by the major control potential $E_2$ appearing across resistor 60. The relative magnitude of the resistance of resistor 99 is small as compared with the impedance of the remainder of the series circuit comprising resistor 109 and capacitor 110, of which it forms a part, so that operation of these last-named devices does not materially change the potential appearing across resistor 99.

In operation of the grid control circuit just described for tube 94, a change in the magnitude of potential $E_2$ causes the capacitor 110, which is charged in accordance with the value of $E_2$, to draw a current through the resistor 109, the voltage drop across which resistor is impressed upon the grid element of tube 94. Assuming that initially the polarity of $E_2$ is such as to make the left end of resistor 60 positive with respect to the right end, an increase in the magnitude of this potential which has been seen lowers the value of negative grid bias $E_g$ to effect an increase in the excitation and a lowering of the speed of motor 10, further charges the capacitor 110 setting up in resistor 109 a voltage drop which makes the left end of the resistor positive with respect to the right end and thereby causes grid element 107 of tube 94 to be negative with respect to cathode element 106. This lowers the tube conductivity, reduces the current through resistor 95 and thereby lowers the magnitude of voltage drop $E_4$, which, in turn, directly reduces the magnitude of predominating potential $E_1$ in grid circuit 58. As a result, grid potential $E_g$ is reduced in addition to the amount directly accounted for by the change in major potential $E_2$.

For the same initial polarity of potential $E_2$ a decrease in this potential, which has been seen directly acts to raise the magnitude of grid voltage $E_g$ for tube 52, allows capacitor 110 to force a discharge current through resistor 109 setting up therein a voltage drop which makes the grid element 107 of tube 94 positive with respect to the cathode element. This raises the conductivity of the tube and increases the magnitude of potential $E_4$ which further raises grid potential $E_g$.

Assuming that the initial potential of major control voltage $E_2$ is such that the right end of the resistor 60 is positive with respect to the left end, an increase in this potential, which has been seen to raise the value of grid control voltage $E_g$ to lower the excitation and raise the speed of motor 10, further charges the capacitor 110 setting up in resistor 109 a voltage drop which makes the right end of the resistor positive with respect to the left end, and thereby renders a grid 107 of tube 94 positive with respect to the cathode element. The resulting rise in tube conductivity raises the magnitude of voltage $E_4$ and thereby increases control potential $E_g$ above the increment directly accounted for by the rise in major control potential $E_2$. In a similar manner, a decrease in the magnitude of $E_2$, which has been seen to lower the value of $E_g$, allows capacitor 110 to force a discharge current through resistor 109 setting up therein a voltage drop which makes the grid element 107 of tube 94 negative. This effects a reduction, in the manner already explained of grid control voltage $E_g$ which is additional to the decrease therein directly accounted for by the reduction in the major control potential.

It is thus seen that auxiliary tube 94 acts as an amplifier to make the variations of major control potential $E_2$ more effective and rapid in producing corresponding changes in the control potential $E_g$ applied to the grid of tube 52. It will be understood that the magnitude of these amplifying changes is greatest simultaneous and immediately after the changes in major control potential $E_2$ which produce them, and that they gradually reduced their value as the charge of capacitor 110 approaches the new value required by the changed magnitude of control voltage $E_2$. The response quickening is, therefore, exceedingly rapid at first when it is most required and gradually tapers off as the corrective change has a chance to take effect. The tendency for the corrective action to overshoot when controlled in this manner is much less pronounced than when the usual type of proportional amplifying means, as utilized in the past, is applied.

It has been mentioned that potential $E_5$ appearing across resistor 99 is for the purpose of contributing a stabilizing influence to the regulating system during changes in the loading and excitation of the regulated motor 10. As has also been pointed out, such an influence is advantageous in that, in addition to preventing overshooting of the corrective action it may be caused to prevent load changes from causing the motor speed to deviate and be corrected by the speed-change-responsive element in the usual manner. Instead, sudden changes in load may directly initiate appropriate changes in excitation before the motor speed has had a change to deviate as a result thereof, and in this manner the accuracy of the speed regulation is materially improved.

In the event that the regulated motor is provided with low resistance interpole or other series windings, such as are represented at 112 for motor 10 in the showing of Fig. 1, the potential drop through them may be utilized to energize one of the saturating windings 115 of a saturable core reactance device shown generally at 114, the impedor windings 117 of which device are disposed in a circuit which energizes a full-wave rectifier 120 through a suitable transformer 122 from the source of alternating current voltage represented by circuit conductors 18. The output terminals of the rectifier 120 are connected, through filter elements 124, to energize a resistor 126, the direct current potential appearing across a portion of which is impresed upon a series connection of a capacitor 128 and the resistor 99. Capacitor 128 is thus changed to a degree determined by the voltage appearing across resistor 126.

In operation of this load compensating equipment, an increase in the energizing current supplied to the armature of the motor 10 raises the voltage drop across series-connected impedance 112 which increases the saturation of the core of device 114 and thereby lowers the reactance offered by windings 117 to the flow of energizing current in the circuit of rectifier 120. This raises the output voltage of the rectifier impressed upon resistor 126 and causes the capacitor 128 to be charged to a higher value thus causing a current to flow through resistor 99. This current sets up in the resistor a voltage drop $E_5$ making the lower end of the resistor positive with respect to the upper end. This voltage $E_5$ is introduced into the grid control circuit 58 in such manner that it adds to predominating voltage $E_1$ and thereby increases the magniture of negative grid bias control voltage $E_g$. This, in turn, effects a decrease in the excitation of motor 10, which directly tends to counteract the tendency of the the motor to reduce its speed as a result of the increased loading.

In a similar manner, when the armature current of motor 10 suddenly decreases, the potential across series connected impedance 112 is correspondingly reduced. The resulting lowering in saturation of reactor 115 raises the impedance to the flow of rectifier energizing current produced by reactor windings 117, and in this manner effects a reduction in the voltage supplied to resistor 126. As a result, the capacitor 128 is allowed to force through series connected resistor 99, a discharge current which reverses the polarity of the voltage drop $E_5$ making the upper end of resistor positive with respect to the lower end. This reversed polarity of voltage $E_5$ causes the voltage to subtract from the dominating voltage $E_1$ and thereby decreases the magnitude of grid control voltage $E_g$. The resulting increase in excitation supplied to motor 10 tends to counteract the tendency for the motor to increase its sped as a result of the lowered loading.

It will be apparent that the changes in loading are effective to directly alter the motor excitation only during their actual progress and immediately thereafter, for as soon as the charge of capacitor 128 has been changed to correspond to the modified value of potential appearing across resistor 126, which potential is proportional to the loading of the motor, the compensating component $E_5$ introduced into the grid control circuit 58 is reduced to zero and the control of the motor excitation is completely restored to the speed-change-responsive impulses which initiate in reactor-differential 20. In connection with this load compensating equipment, it will be evident that in case the regulated motor is not supplied with the interpole windings represented at 112, a suitable impedance element may in their stead be inserted in the armature winding circuit to provide a voltage drop, which is proportional to the load current.

In order that adjustments in motor excitation may be discontinued somewhat prematurely, to prevent hunting, I also associate with reactance device 114 a second saturating winding 116 which is energized by the voltage appearing across the shunt field winding 16 of the regulated motor 10, the polarity of such energization being such that winding 116 aids winding 115 in saturating the reactor core. It has been seen that an increase in this saturation, by reducing the voltage impresed upon resistor 126, and that a lowering of the saturation by similarly raising this voltage, temporarily alter the excitation-control potential $E_g$ in the excitation-lowering and excitation-raising directions, respectively.

Consequently when the field-winding current of motor 10 is raised, winding 116, by further saturating reactor 114, effects a temporary increase in the control potential $E_g$ which tends to retard the excitation-raising action. In a similar manner, a lowering of motor field-winding current effects a temporary decrease in the magnitude of control potential $E_g$ which tends to retard the excitation-lowering action. It will be apparent that such modifications, depending as they do upon the current drawn by capacitor 128, continue only during the actual progress of excitation changes, as has been explained for load compensation.

The magnitude of these compensating and anti-hunting influences may be adjusted by changing the setting of a tap connection 132 along resistor 126, the impulses being strongest when the tap connection is at the upper end of resistor 126 and weakest as the connection is moved toward the lower end.

Still considering the complete grid control circuit 58, it has been noted that the resistor 92 is also provided with a tap connection 134 by means of which the magnitude of voltage $E_k$ may be adjusted. The purpose of this adjustment is to properly set the range of variation in the control potential $E_g$, which results from the several influences acting in the circuit 58 in such manner that tube 52 controlled thereby will be influenced by grid potentials of the proper or most advantageous values.

The description of the regulating system depicted in Fig. 1 has thus far been confined to the operations which are necessitated to maintain the speed of regulated motor 10 in the desired predetermined relation with respect to the speed of master machine 22. It will be understood that additional regulated motors, one of which is represented at 12 for speed comparison with a second master machine 26, are each provided with excitation control equipment which is a duplicate of that which has been explained in connection with motor 10. Inasmuch as the duplication may be exact, no attempt is here made to show the details of more than one of the control assemblages.

The system of Fig. 1 is illustrated as utilizing a speed-change-responsive control device 20 in the form of an adjustable reactor. While this is perhaps a preferred type of device, it is not the only variety which may be utilized to initiate changes in regulated motor excitation in response to deviations in the speed of that motor from that of a standard or master machine. Thus in Figs. 3 and 4, I have illustrated at 20' a differential device in the form of a variable capacitor which, in combination with a fixed capacitor 84', serves to control the rectifier bridge 62 in a manner exactly comparable to that described in connection with Fig. 1.

Figure 3:
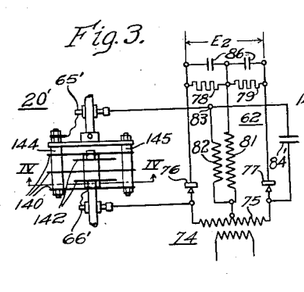
Fig. 3 illustrates a capacitor-differential device suitable for effecting control of the rectifier-bridge circuit comprised by the system of Fig. 1.
Figure 4:
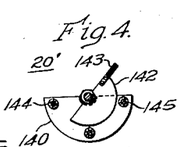
Fig. 4 is a sectional view of the device of Fig. 3 taken on line IV—IV of that figure.

One set of plates 140 of device 20' is driven by the regulated machine in the same manner as is core element 68 in the showing of Fig. 1, while the other set of plates 142 is driven by the master speed machine in the same manner as is core element 70 in the showing of Fig. 1. To limit the relative movement of the two sets of cooperating plates within the range of complete capacitance adjustment which, in the showing of Figs. 3 and 4, is 180°, the set of plates having the smaller diameter may be provided with a protrusion 143 of insulating material which engages with the supporting and spacing elements 144 and 145 of the larger diameter set of plates as the minimum and maximum points in capacitance adjustments are reached.

As long as the speeds of the regulated and master machines which rotate in the same direction match each other, no relative movement of the two sets of plates 140 and 142 takes place. However, in the event that the speed of the regulated machine starts to decrease, relative movement between two sets of plates in the capacitance-decreasing direction will be caused to take place while, when the speed of the regulated machine rises, a comparable movement in the capacitance-increasing direction will result.

The two sets of plates are respectively connected through suitable slip rings 65' and 66' with the rectifier bridge circuit 62 in the same manner as are the two ends of winding 64 in the device shown in Fig. 1. Operation of the bridge as a result of changes in the capacitance of the device 20' is exactly the same as results from changes in the reactance of device 20 in Fig. 1, hence, no detailed description will here be repeated.

Figure 5:
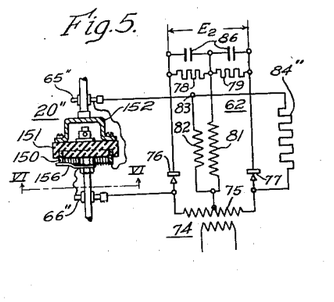
Fig. 5 illustrates a resistor-differential device suitable for effecting control of the rectifier-bridge circuit comprised by the system of Fig. 1.
Figure 6:
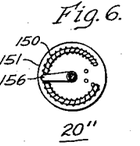
Fig. 6 is a sectional elevation of the device of Fig. 5 taken on line VI—VI of the figure.

If desired, the speed change responsive element may also be in the form of a rheostat 20'', as indicated in Figs. 5 and 6, which together with a fixed resistor 84'' serves to control the rectifier bridge circuit 62. The rheostat is illustrated as comprising a resistor element 150 mounted on a suitable base 151 which base is supported by a bracket 152 mounted on the end of a shaft driven by the regulated motor. Cooperating with the resistor element 150 is a rotatably movable contact member 156 which is actuated by the shaft driven by the standard speed machine in the same manner as is core element 70 of device 20 of Fig. 1.

Connections with the bridge circuit 62 are made through suitable slip rings 65'' and 66'' in the same manner as from devices 20 and 20' shown in Figs. 1 and 3. A decrease in the speed of the regulated motor acts to change the relative position of resistor element 150 with respect to contact making member 156 in such manner as to lower the resistance presented by device 20'' and increases in the motor speed similarly act to raise the resistance of device 20''. The operation in connection with rectifier bridge 62 being essentially the same as that explained in detail for the showings of Fig. 1, no attempt to repeat it is here made.

Figures 7, 8:
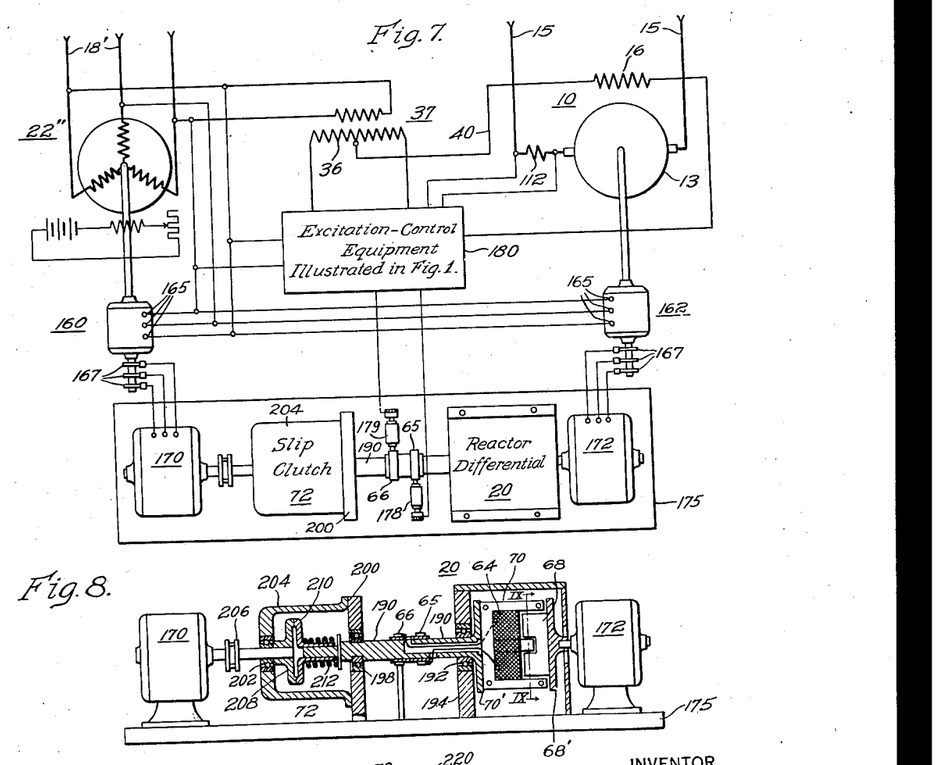
Fig. 7 is a diagrammatic representation, with the regulating system of my invention, of a preferred form of mechanical construction for the reactor-differential control device of Fig. 1 and driving mechanism therefor.
Fig. 8 is a side view, partially in section, of the electrical differential and pilot driving motor assemblage illustrated in Fig. 7.

In Fig. 7, I have illustrated one preferred manner of applying the regulating system of my invention to a single pair of motors, the speeds of which are to be matched. The regulated motor is illustrated at 10 as being a duplicate of that already described in connection with Fig. 1, while the master motor with which the speed of the regulated machines to be matched is shown at 22'' in the form of a three-phase synchronous machine which is energized from a suitable alternating current source comprising conductors 18'. Machines 10 and 22'' respectively drive induction generators 162 and 160 which in mechanical construction may be similar to rotor-wound induction motors. Each of these generators comprises three phase-armature windings (not shown) terminating in terminals 165 and three-phase rotor windings (not shown), the connections of which are brought out to slip rings 167. The stator windings are excited from the three phase source of power 18' while the rotor windings are connected to energize pilot motors 170 and 172 comprised by a preferred form of mechanical construction and mounting for the speed-change-responsive reactor device 20 and the slip clutch 72 through which the device is driven. The two pilot motors 170 and 172, the reactor differential 20, and the slip clutch 72 are all mounted, as is more clearly illustrated in Fig. 8, on a common base member 175. Connections from the slip rings 65 and 66 are made, through suitable brush holding members 178 and 179, with the excitation-control equipment 180, the details of which equipment are the same as shown in Fig. 1.

To insure a satisfactory mechanical construction, one side 68' of the reactor device 20 is supported from the end of the shaft of pilot motor 172 while the other side 70' is carried by the end of a shaft 190 which is supported by a ball bearing assembly 192 carried by a suitable bracket member 194. Connections from the winding 64 of the reactor element are brought through the hollow shaft 190 to the slip rings 65 and 66 mounted thereon.

The other end of shaft 190 is supported by a second ball bearing assembly 198 supported by a bracket 200 which forms the mounting member for the slip clutch mechanism 72. A third ball bearing assembly 202 is supported by a casing 204 comprised by slip clutch 72.

Driven by pilot motor 170 through a coupling 206 is one plate element 208 of the slip clutch 72 against which plate the other cooperating element 210 is held by means of a spring 212 to produce a frictional driving engagement. The entire assembly is surrounded by the casing 204 into which lubricating oil may be introduced.

As is shown in Fig. 9 which is a sectional view taken on line IX—IX through the reactor device 20, relative movement between the two core portions 68 and 70 is restricted to a range of somewhat less than 90° by means of projecting pins 220 and 221 carried by the mounting plate 68' with which pins, core member 70 respectively engages when moved to the maximum reactance and minimum reactance positions with respect to core member 68.

In operation of the equipment illustrated in Fig. 7, pilot generators 160 and 162 are both driven at speeds preferably approximating twice their synchronous values based on the frequency of exciting voltage applied to the stator windings. There is thus induced, when the exact double synchronous speed relation is maintained, in the rotor windings of the generators, voltages of frequencies equal to that of the exciting voltage acting in circuit 18'. The rotor winding induced voltages are impressed, through the slip connections 167, upon pilot machines 170 and 172, which are synchronous motors, and which are thus caused to rotate at speeds directly proportional to those of machines 22' and 10.

Deviations from the balanced value in the speed of regulated motor 10 causes corresponding changes in the frequency of the output voltage of generator 162 which correspondingly changes the speed of pilot motor 172. This speed change acts to vary the reactance of device 20 and effects, through the excitation control equipment 180, an appropriate change in the excitation of motor 10 which corrects its speed.

It will be understood that instead of the induction generators 160 and 162, synchronous generators might instead be used, the advantage of the induction generators being that no separate source of current excitation therefor is required.

In many cases, as will be understood, the pilot generator scheme shown in Fig. 7 is required, particularly when it is impossible to make a direct mechanical connection between the shafts of the master speed machine and the regulated motor.

Although I have shown and described certain specific embodiments of my invention, I am fully aware that many changes and modifications thereof are possible. My invention, therefore, is not to be restricted except insofar as is necessitated by the prior art and the scope of the appended claims.

I claim as my invention:

1. A speed-regulating system for an electric motor comprising, in combination, a master-speed machine, an electrical impedor control unit disposed to convert variations in the speed of said motor from that of the master-speed machine into changes in the impedance characteristics of the unit, speed-adjusting means for said motor comprising an electronic tube, a control circuit for said tube, means, comprising an alternating-current energized rectifier-bridge circuit, for converting the impedance changes of said control unit into corresponding variations in a direct-current potential, and means for introducing said potential into the control circuit of said tube.

2. A regulating system comprising, in combination, quantity-adjusting means utilizing an electronic tube, a control circuit for said tube, an error-responsive device disposed to convert variations from a desired value of a quantity into changes in the impedance of the device, a rectifier-bridge circuit, controlled by said device, comprising two opposing branches in each of which is disposed a rectifier, means for energizing said branches by alternating-current potentials which are of equal magnitude when the impedance of said device is of an intermediate value and of unbalanced values when the impedance of the device varies from said intermediate, and means for impressing the sum of the opposing direct-current output voltages of said two bridge-circuit branches upon the control circuit of said electronic tube.

3. In a regulating system comprising an electronic tube utilized by a quantity-adjusting means and a control device disposed to supply corrective impulses in the form of changes in its own reactance characteristics, the combination of a rectifier-bridge circuit comprising two opposing branches in each of which is disposed a rectifier, means for supplying to said branches alternating-current energizing potentials of similar magnitude, a second reactor element disposed in association with said bridge circuit and the control device in such manner that when the reactance of the control device differs from that of the said element the bridge-circuit branch potentials will be correspondingly unbalanced, and means for impressing the sum of the opposing direct-current output voltage of said two bridge-circuit branches upon said electronic tube.

4. In a speed-regulating system for an electric motor comprising electronic-tube speed-adjusting means for the motor, a grid-control circuit for said tube means, means for converting variations from a desired value in the speed of said motor into changes in a unidirectional control potential, and means for impressing said potential upon the said grid-control circuit, the combination of means for quickening the response of said regulating system comprising an auxiliary electronic tube disposed to introduce a modifying potential into the grid-control circuit of the speed-adjusting means, and means for impressing upon said second tube a control potential which varies in accordance with the direction and rate of change of said uni-directional speed-error-responsive potential.

5. In a regulating system comprising a quantity-adjusting means utilizing an electronic tube, a grid-control circuit for said tube, means for converting deviations from a desired value in a quantity into variations in a unidirectional voltage, and means for impressing said voltage upon the said grid-control circuit, the combination of a second electronic tube disposed to control a modifying potential which is introduced into the said grid-control circuit, a resistor and a capacitor connected in series for energization by said unidirectional control voltage, and means for controllably impressing upon said second electronic tube the voltage drop set up in said resistor by the passage of capacitor current therethrough.

6. In a regulating system comprising a quantity-adjusting means utilizing an electronic tube, a grid-control circuit for said tube, means for converting deviations from a desired value in a quantity into variations in a unidirectional voltage, and means for impressing said voltage upon the said grid-control circuit, the combination of a resistor disposed in said grid-control circuit, a second electronic tube, means for causing said second tube to circulate current through said resistor, a second resistor and a capacitor connected in series for energization by said unidirectional control voltage, and means for controllably impressing upon said second electronic tube the voltage drop set up in said second resistor by the passage of capacitor current therethrough.

7. In a speed-regulating system for an electric motor comprising electronic-tube speed-adjusting means for the motor, a grid-control circuit for said tube means, means for converting deviations in the speed of said motor from a desired value into changes in a direct-current control voltage, and means for impressing said voltage upon the said grid-control circuit, the combination of means for stabilizing the corrective actions effected by said system comprising means for introducing into said grid-control circuit a modifying potential which varies in accordance with the direction and rate of change of said direct-current speed-error-responsive voltage.

8. In a regulating system comprising a quantity-adjusting means utilizing an electronic tube, a grid-control circuit for said tube, means for converting deviations from a desired value in a quantity into variations in a direct-current voltage, and means for impressing said voltage upon the said grid-control circuit, the combination of means for stabilizing the corrective actions effected by said system comprising a resistor and a capacitor connected in series for energization by said direct-current voltage, and means for introducing into said grid-control circuit the voltage drop set up in said resistor by the passage of capacitor current therethrough.

9. In a speed-regulating system for an electric motor comprising electronic-tube speed-adjusting means for the motor, a grid-control circuit for said tube means, means for converting deviations in the speed of said motor from a desired value into changes in a direct-current control potential, and means for impressing said potential upon the said grid-control circuit, the combination of means for stabilizing the system during load changes on said motor comprising means for introducing into said grid-control circuit a modifying potential which varies in accordance with the direction and rate of change of the motor loading.

10. In a speed-regulating system for an electric motor comprising electronic-tube speed-adjusting means for the motor, a grid-control circuit for said tube means, means for converting deviations in the speed of said motor from a desired value into changes in a direct-current control potential, and means for impressing said potential upon the said grid-control circuit, the combination of means for stabilizing the system during load changes on said motor comprising means for producing a voltage which varies in accordance with the motor load current, a capacitor and a resistor connected in series for energization by said voltage, and means for introducing into said grid-control circuit the voltage drop set up in said registor by the passage of capacitor current therethrough.

11. In a speed-regulating system for an electric motor having armature and field windings, means for supplying direct-current energization to said windings, electronic-tube means for adjusting the field winding current of the motor, a grid-control circuit for said tube means, and means for influencing said circuit by a direct-current potential which varies in accordance with deviations in the speed of said motor from a desired value, the combination of a saturable-core reactor, a rectifier, means for supplying alternating-current energization to said rectifier through a circuit which includes said reactor, a resistor disposed in said grid-control circuit, a capacitor connected in series with said resistor for energization by the output voltage of said rectifier, and means for saturating said reactor in accordance with the magnitude of the armature winding current of the motor.

12. In a speed-regulating system for an electric motor comprising electronic-tube excitation-adjusting means for the motor, a grid-control circuit for said tube means, means for converting deviations in the speed of said motor from a desired value into changes in a direct-current control potential, and means for impressing said potential upon said grid-control circuit, the combination of means for introducing into said grid-control circuit a modifying potential which varies in accordance with the direction and rate of change of the motor excitation, said modifying potential acting to prevent overshooting of the corrective actions of the regulating system.

13. In a speed-regulating system for an electric motor having armature and field windings, means for supplying direct-current energization to said windings, electronic-tube means for adjusting the field-winding current of the motor, a grid-control circuit for said tube means, and means for influencing said circuit by a direct-current potential which varies in accordance with deviations in the speed of said motor from a desired value, the combination of a saturable-core reactor, a rectifier, means for supplying alternating-current energization to said rectifier through a circuit which includes said reactor, a resistor disposed in said grid-control circuit, a capacitor connected in series with said resistor for energization by the output voltage of said rectifier, and means for saturating said reactor in accordance with the magnitude of the voltage appearing across the field winding of the motor.

14. In a speed-regulating system for an electric motor having armature and field windings, means for supplying direct-current energization to said windings, electronic-tube means for adjusting the field-winding current of the motor, a grid-control circuit for said tube means, and means for influencing said circuit by a direct-current potential which varies in accordance with deviations in the speed of said motor from a desired value, the combination of a saturable core reactor, a rectifier, means for supplying alternating-current energization to said rectifier through a circuit which includes said reactor, a resistor disposed in said grid-control circuit, a capacitor connected in series with said resistor for energization by the output voltage of said rectifier, means for saturating said reactor in accordance with the magnitude of the armature-winding current of the motor, and additional means for saturating said reactor in accordance with the magnitude of the voltage appearing across the field winding of the motor.

FINN H. GULLIKSEN